(12) United States Patent
Waugh

(10) Patent No.: US 10,060,131 B2
(45) Date of Patent: Aug. 28, 2018

(54) CENTRIFUGALLY CAST POLE AND METHOD

(71) Applicant: Tom W. Waugh, Birmingham, AL (US)

(72) Inventor: Tom W. Waugh, Birmingham, AL (US)

(*) Notice: Subject to any disclaimer, the term of this patent is extended or adjusted under 35 U.S.C. 154(b) by 0 days.

(21) Appl. No.: 14/633,713

(22) Filed: Feb. 27, 2015

(65) Prior Publication Data
US 2015/0167301 A1 Jun. 18, 2015

Related U.S. Application Data

(60) Continuation of application No. 13/289,430, filed on Nov. 4, 2011, now Pat. No. 8,967,231, which is a
(Continued)

(51) Int. Cl.
B22D 13/02 (2006.01)
E04C 3/32 (2006.01)
(Continued)

(52) U.S. Cl.
CPC ............. *E04C 3/32* (2013.01); *B22D 13/023* (2013.01); *B22D 13/12* (2013.01); *E04B 1/24* (2013.01); *B22D 13/02* (2013.01)

(58) Field of Classification Search
CPC ...... B22D 13/00; B22D 13/023; B22D 13/02; B22D 13/12
See application file for complete search history.

(56) References Cited

U.S. PATENT DOCUMENTS

| 31,482 A | 2/1861 | Shavor |
| 122,656 A | 1/1872 | Rogers |
| (Continued) | | |

FOREIGN PATENT DOCUMENTS

| CA | 693708 | 9/1964 |
| JP | 2006-102428 | 4/2006 |

OTHER PUBLICATIONS

"Thick-walled Cast Pipe with Small Caliber in Centrifugal Casting", Lu Wenlong etc., Special Casting & Nonferrous Alloys, No. 5, 2003, Dec. 31, 2003; 1 page.
(Continued)

*Primary Examiner* — Kevin P Kerns
*Assistant Examiner* — Steven S Ha
(74) *Attorney, Agent, or Firm* — FisherBroyles, LLP

(57) ABSTRACT

Herein disclosed is a centrifugally cast pole having a substantially uniform wall thickness along the long axis of the pole. During centrifugal casting, molten metal is poured inside a rotating, tapered mold. As chilled liquid is poured over the outside of the rotating mold, the metal forms, or paints, to the contour of the mold interior creating a metal pole. By precisely controlling casting gyrations such as the spin, travel, pitch, and yaw of the rotating mold and the calibration and physical mechanisms of the casting machine, hollow, tapered, tubular metal poles are produced with previously unknown uniformity of wall thickness. The controlling principles, designs, and mechanisms of this centrifugal casting method enable wall uniformity to extremely high tolerances. By extension, the ability to precisely control the metal volume painted inside the mold allows, as a design choice, wall thickness variation in any embodiment if so desired.

6 Claims, 4 Drawing Sheets

Related U.S. Application Data division of application No. 11/458,407, filed on Jul. 19, 2006, now Pat. No. 8,567,155.

(51) Int. Cl.
  *B22D 13/12* (2006.01)
  *E04B 1/24* (2006.01)

(56) References Cited

U.S. PATENT DOCUMENTS

| | | |
|---|---|---|
| 822,499 A | 6/1906 | Ancona |
| 890,373 A | 6/1908 | Orr |
| 1,329,295 A | 1/1920 | De Lavaud |
| 1,551,827 A | 9/1925 | Ladd |
| 1,897,631 A | 2/1933 | Clark |
| 2,420,298 A | 5/1947 | Breakefield et al. |
| 2,577,423 A | 12/1951 | Ludwig et al. |
| 2,623,809 A | 12/1952 | Myers |
| 3,134,147 A | 5/1964 | Johnston |
| 3,270,480 A | 9/1966 | Becker |
| 3,791,154 A | 2/1974 | Crain |
| 3,792,680 A | 2/1974 | Allen |
| 3,813,837 A | 6/1974 | McClain et al. |
| 3,853,418 A | 12/1974 | Druin et al. |
| 3,936,206 A | 2/1976 | Meisberger |
| 4,095,643 A | 6/1978 | Farlow et al. |
| 4,157,111 A | 6/1979 | Tanaka et al. |
| 4,316,495 A | 2/1982 | Pierrel |
| 4,370,719 A | 1/1983 | Upchurch et al. |
| 4,388,787 A | 6/1983 | Milbright |
| 4,401,481 A | 8/1983 | Gilvar et al. |
| 4,448,610 A | 5/1984 | Bellocci |
| 4,570,698 A | 2/1986 | Kollberg |
| 4,572,278 A | 2/1986 | Sundberg |
| 4,751,804 A | 6/1988 | Cazaly |
| 5,175,971 A | 1/1993 | McCombs |
| 5,343,930 A | 9/1994 | Yagi et al. |
| 5,492,579 A | 2/1996 | Hosford et al. |
| 5,513,477 A | 5/1996 | Farber |
| 5,784,851 A | 7/1998 | Waugh |
| 5,964,143 A | 10/1999 | Driscoll et al. |
| 6,253,662 B1 | 7/2001 | Zelson |
| 6,739,103 B1 | 5/2004 | Noirot |
| 6,932,143 B2 | 8/2005 | Noble |
| 7,022,270 B2 | 4/2006 | Maybee |
| 7,252,033 B1 | 8/2007 | Lin |
| 7,762,041 B1 * | 7/2010 | Wawrzeniak ............ E04C 3/32 403/359.6 |
| 8,302,368 B1 | 11/2012 | Keel |
| 8,567,155 B2 | 10/2013 | Waugh |
| RE45,329 E | 1/2015 | Waugh |
| 8,967,231 B2 | 3/2015 | Waugh |
| 2008/0023172 A1 | 1/2008 | Waugh |

OTHER PUBLICATIONS

English Translation of Chinese Office Action dated Oct. 12, 2010 in corresponding Chinese Patent Application No. 2007800322262.4; 8 pages.
Amended Petition for Inter Parties Review of U.S. Pat. No. 8,567,155 Under 35 U.S.C. Sections 311-319 Submitted Jun. 11, 2014; pp. 1-64.
Prosecution History of U.S. Pat. No. 8,567,155; Exhibit 1003; pp. 1-402.
Declaration of Gene Oliver; Exhibit 1004; pp. 1-57.
Prosecution History of U.S. Appl. No. 13/289,430; Exhibit 1005; pp. 1-166.
Ductile Iron Pipe Versus PVC; Exhibit 1010; pp. 1-24.
Seamless Pole Webpage—FAQs; Exhibit 1011; pp. 1-9.
J. Wallace, Engineering Aspects of Centrifugal Casting; Exhibit 1013; pp. 1-19.
The Design Decision Model for Corrosion Control; Exhibit 1018; pp. 1-10.
Decision Instituting of Inter Parties Review; Oct. 24, 2014, pp. 1-20.
International Search Report dated Jan. 17, 2011 for Corresponding PCT Application No. PCT/US2008/004578; 4 Pages.
Office Action Issued in U.S. Appl. 14/272,076 dated Jun. 25, 2014.
Notice of Allowance Issued in U.S. Appl. 14/272,076 dated Nov. 14, 2014.
Petition for Inter Partes Review of U.S. Pat. No. Re. 45,329 Under 35 U.S.C. §311-319, Filed Nov. 25, 2015.
Preliminary Response of Patent Owner for IPR2016-00266, dated Mar. 10, 2016.
Decision, Institution of Inter Partes Review, for IPR2016-00266, dated May 25, 2016.
Patent Owner's Response to Petition for Inter Partes Review Under 37 C.F.R. §42.107 for IPR2016-00266, dated Aug. 26, 2016.
Petitioner's Reply to Patent Owner's Response for IPR2016-00266, dated Dec. 5, 2016.
Final Written Decision for IPR2016-00266, dated May 23, 2017.

* cited by examiner

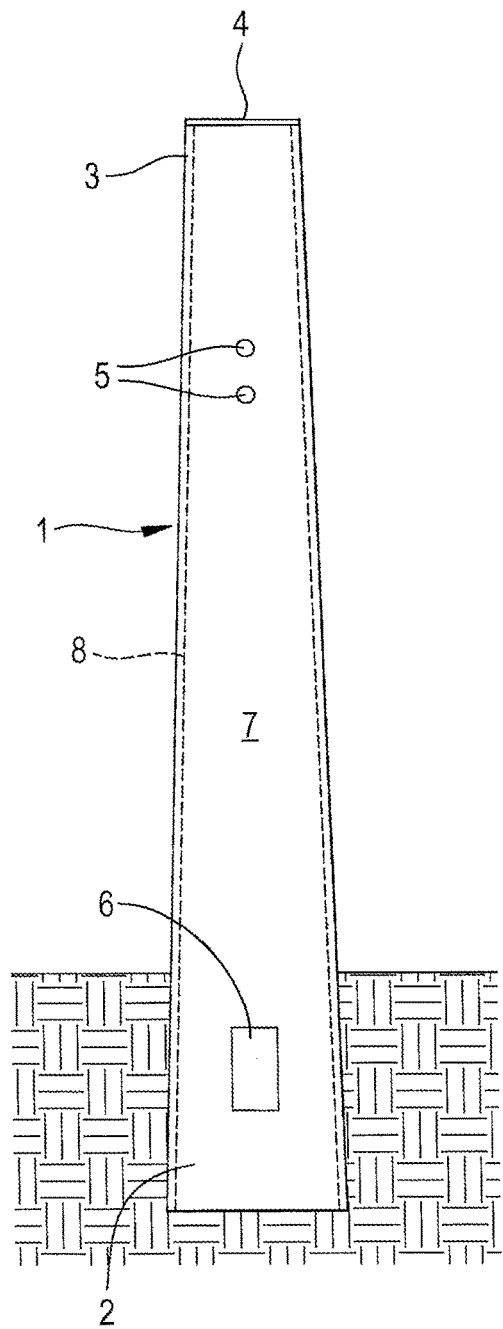
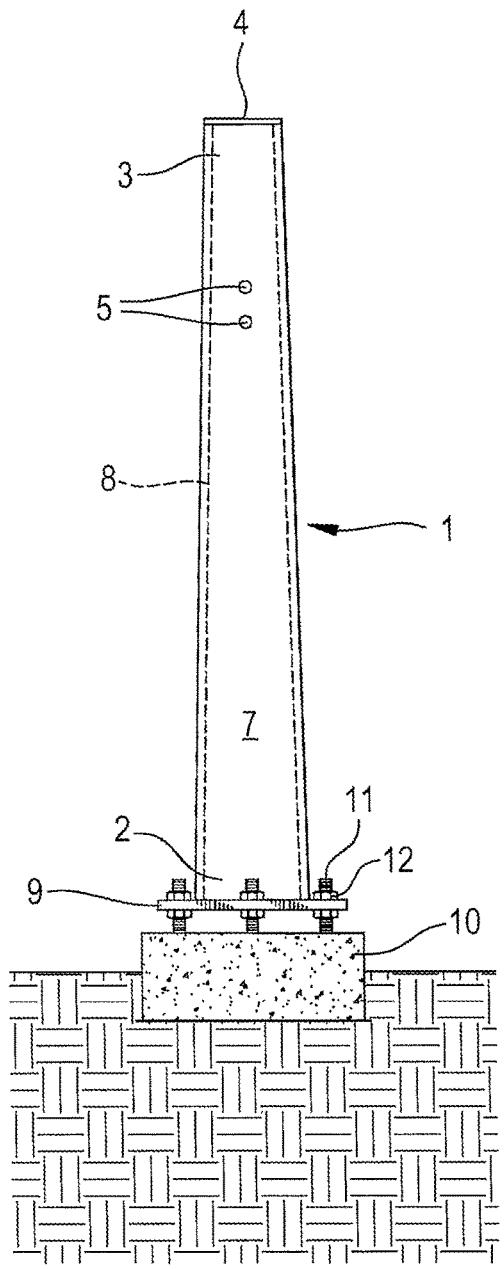
FIG. 1
FIG. 2

CENTRIFUGALLY CAST POLE AND METHOD

This is a continuation of U.S. application Ser. No. 13/289,430 filed Nov. 4, 2011, which is a divisional of U.S. application Ser. No. 11/458,407 filed Jul. 19, 2006, the entire contents of which are hereby incorporated by reference.

BACKGROUND OF THE INVENTION

1. Field of the Invention

This invention relates generally to hollow structural members and more specifically to hollow utility poles having tapered external dimensions and substantially uniform wall thickness.

2. Description of the Prior Art

The geometric shape of tapered poles in high stress, high lateral-force environments typically encountered in the utility industry inherently provides the greatest cross-sectional strength at or near the base of the pole where reactive forces tend to combine and converge.

Problems associated with the use of wooden poles within the utility industry are numerous and well documented. These problems include ground line decay, the tendency of wooden poles to bend or arc under high lateral forces (thereby requiring the use of guying cables, anchors and other auxiliary hardware), deterioration caused by birds and other animals, vibration damage to attached hardware and fixtures, shortages of suitable trees for producing large poles, and high breakage rate due to natural and manmade forces. Additionally, wooden poles as a general rule must be replaced after approximately 20-30 years of service. Of particular note, replacement and disposal of wooden poles is a mounting, exorbitant liability for companies, especially when these poles cannot be incinerated due to regulatory mandates. Further, some utility companies have resorted to wrapping their wooden poles in wire mesh to prevent damage to the poles by birds and other animals.

Other companies have resorted to using hollow concrete poles, particularly with regard to high voltage electric transmission systems, in order to overcome some of the difficulties associated with wooden poles. Concrete utility poles, however, are expensive to produce, are very heavy and require special heavy-duty equipment to load, transport, unload and install. Further, due to strength requirements, concrete poles are usually solid at the top, where the pole has its smallest diameter. Moreover, field modifications of concrete poles are generally very time consuming, cumbersome and thus very costly.

Steel utility poles are currently available in the market. Steel poles are typically produced by cutting thin and malleable steel plates and forming the plates, using metal brakes and other hot and/or cold metal shaping methods, into two multi-sided halves which are then welded together. Such poles are quite expensive to produce and, as a consequence of the thin walls necessary to form them, result in poles having relatively large base diameters in order to achieve the necessary strength to be used in high stress, high lateral-force situations such as those subject to utility poles. Further, wall thickness can be varied only sectionally, if at all.

Aluminum alloy utility poles are also available. However, these poles are generally appropriate for low stress, single-use application, such as highway lighting. Further, aluminum poles are not currently formed by centrifugal casting methods and are typically produced by hot or cold metal-shaping methods. Moreover, aluminum poles do not have the necessary qualities or strength to be used in high lateral-force environments, such as those to which utility poles are subjected.

Ductile iron has characteristics which are ideal for use in the utility pole environment. For example, ductile iron has a superior strength/weight ratio, is machineable, resilient (as opposed to brittle), has favorable damping properties, is rust proof and is cheaper than aluminum and concrete. Therefore, if centrifugally cast into geometric shapes necessary for utility pole applications, ductile iron would provide a virtually maintenance free, extremely long life (many 100+ year old ductile iron water mains are still in use), low cost utility pole which effectively overcomes the problems and difficulties associated with other utility poles as discussed hereinabove.

Centrifugal casting offers additional benefits over alternative production techniques such as metal forming. For instance, centrifugal casting produces a seamless pole, which ensures overall strength in high stress, high lateral-force environments. Furthermore, centrifugal casting allows a large volume of poles to be produced inexpensively through a mechanized process involving little human labor. Since long, seamless sections can be cast in a single pass, subsequent joining procedures during manufacture or field installation are reduced or eliminated. Also, centrifugal casting produces a much more precise pole than that created through metal forming, and is capable of producing poles within tolerances of 0.001 mm. In summary, centrifugal casting produces stronger, less labor-intensive poles that are more easily mass produced for a wider variety of applications.

Prior to the present invention, centrifugal casting of tapered metal utility poles (including ductile iron) has been limited by the casting technology. Single-speed casting methods (such as that disclosed in Applicant's prior U.S. Pat. No. 5,784,851) prevented the metal infusion from dispersing properly such that the amount painted on the inside of the mold as it spins and travels can be deposited end-to-end uniformly to high tolerances (0.001 mm.). This has meant that centrifugal casting of tapered poles was only slightly more versatile than metal rolling, though there are other advantages mentioned hereinabove. The present invention overcomes this limitation by introducing a variable-speed, variable-infusion casting method, whereby the metal-painting is precisely controlled by increasing or decreasing the metal pouring rate and the spin speed of the mold. Depending upon the desired specifications, poles can be formed with walls that are thick at bottom and thin at top, that vary in thickness at specified points, or that are substantially uniform in wall thickness along the long axis of the pole.

Further, the present invention allows production of poles that fulfill specific application requirements. For example, while some applications require variable thicknesses (thin at the top, thick at the ground line to resist line loads and corrosion), other applications may require uniform thickness for maximized structural support. The present invention also fulfills applications that require extreme or variable heights, in that the poles may be cast with slip-jointed pole sections, whereby the tapered section of one pole can be secured into the butt end of another pole to reach specified effective pole lengths. Additionally, special applications may require further enhancement of the pole during or post-casting including, but not limited to, wind-resistant texturing, mount flanges, hardware and fixture access holes or panels, and top-end caps.

SUMMARY OF THE INVENTION

In view of the foregoing, the present invention relates to a centrifugally cast hollow pole having a wall thickness which is substantially uniform along the long axis of the pole.

In one embodiment, a conically tubular pole having tapered external dimensions and a substantially uniform wall thickness along the long axis of the pole is produced via centrifugal casting, whereby molten metal is poured inside a rotating, tapered mold. As chilled liquid is poured over the outside of the rotating mold, the metal forms, or paints, to the contour of the mold interior creating a metal pole. By precisely controlling casting gyrations such as the spin, travel, pitch, and yaw of the rotating mold and the calibration and physical mechanisms of the casting machine, hollow, tapered, tubular metal poles are produced with previously unknown uniformity of wall thickness. The controlling principles, designs, and mechanisms of this centrifugal casting method enable wall uniformity to extremely high tolerances. By extension, the ability to precisely control the metal volume painted inside the mold allows, as a design choice, wall thickness variation in any embodiment if so desired.

It is an object of the present invention to provide a hollow, tapered pole which is easy and economical to produce having a wall thickness that is substantially uniform along the length of the pole. The ability of this new method to produce uniform wall thicknesses is especially important in applications where lateral forces can cause disastrous utility pole failure, such as by hurricane-force winds.

Another important advantage of the present invention is the centrifugal casting of poles utilizing any molten materials such as ductile iron, steel, aluminum, or castable composite material, thereby rendering the pole virtually maintenance free and impervious to ground line decay, fungus, humidity, animal damage and other causes of deterioration.

A further advantage of the present invention is that a pole centrifugally cast of ductile iron would be comparatively lightweight, would have the physical strength of mild steel with the long life expectancy of gray cast iron, would be virtually unbreakable in ordinary service and would be 100% salvageable.

Yet another advantage of the present invention is that a pole centrifugally cast of ductile iron would offer the greatest possible margin of safety against service failure due to ground movement and beam stresses and would provide increased resistance to breakage caused by handling, shipping and installation.

An important advantage of the present invention is that molds can be produced by welding, flanging or threading shorter sections together into a single molding tube.

The invention is particularly advantageous in that a pole centrifugally cast can be direct buried or may be flanged for attachment to poured or preformed foundations.

A further advantage of the present invention is that the hollow design of a centrifugally cast pole allows for internal wiring of fixtures and other attachments to said pole.

An important improvement to the present invention is the provision of a texturing process during casting that augments the strength of the pole. A mold with a textured interior wall surface may be utilized, thereby producing a final product with a pimpled exterior surface. The resulting pimpled pole benefits through improved wind resistance in whatever embodiment and field of use.

To enhance extreme height/extreme stress applications, the pole may also be cast in such a way that the wall thickness near the butt of the pole is sufficient to accommodate the formation, during the casting operation, of a slip joint having internal cross-sectional dimensions sufficient to allow the pole to slidably receive the top portion of another centrifugally cast pole whereby providing for virtually unlimited pole extensions.

Additionally, an end cap can be designed for field installation to protect all internal hardware.

The present invention also addresses the post-cast annealing process in a new way. This new method begins during casting, whereby mold-induced flanging of the large-diameter end of the tapered pole becomes, in effect, a control-point for bearing the pole through the annealing process. The flange is simply a larger based circle, or ring, cast at the pole's large-diameter end. Once the pole is removed from the mold, this flanged ring is engaged by a control rail such that the pole can be run through a straight annealing furnace. As the rail engages the running ring, the tapered pole is prevented from inadvertently sliding or rolling from the conveyance as the pusher chains engage and move the pole through the furnace. This ring also allows the pole to be placed inside of a straight pipe which rolls through the annealing furnace.

Lastly, it is noteworthy that the present invention is not limited to use in the utility pole field. Rather, the present invention may be advantageous wherever a structural pole member is needed. For instance, the present invention could be used as a tapered support piling. The tapered shape of the piling would impart the necessary load capacity while minimizing the piling's embedment in the bearing stratum. The tapered shape would also require less concrete volume to fill than a traditional cylindrical piling. Further, the piling could be pimpled on its surface to enhance the load bearing capacity of the piling. Finally, ductile iron would be an ideal choice for pilings because of its compressive strength and corrosion resistance.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a side view of an embodiment of the invention showing the invention in a direct burial configuration.

FIG. 2 is a side view of the embodiment of FIG. 1 showing the invention in a flanged, based or foundation-mounted configuration.

DETAILED DESCRIPTION OF THE PREFERRED INVENTION

Figure 3:
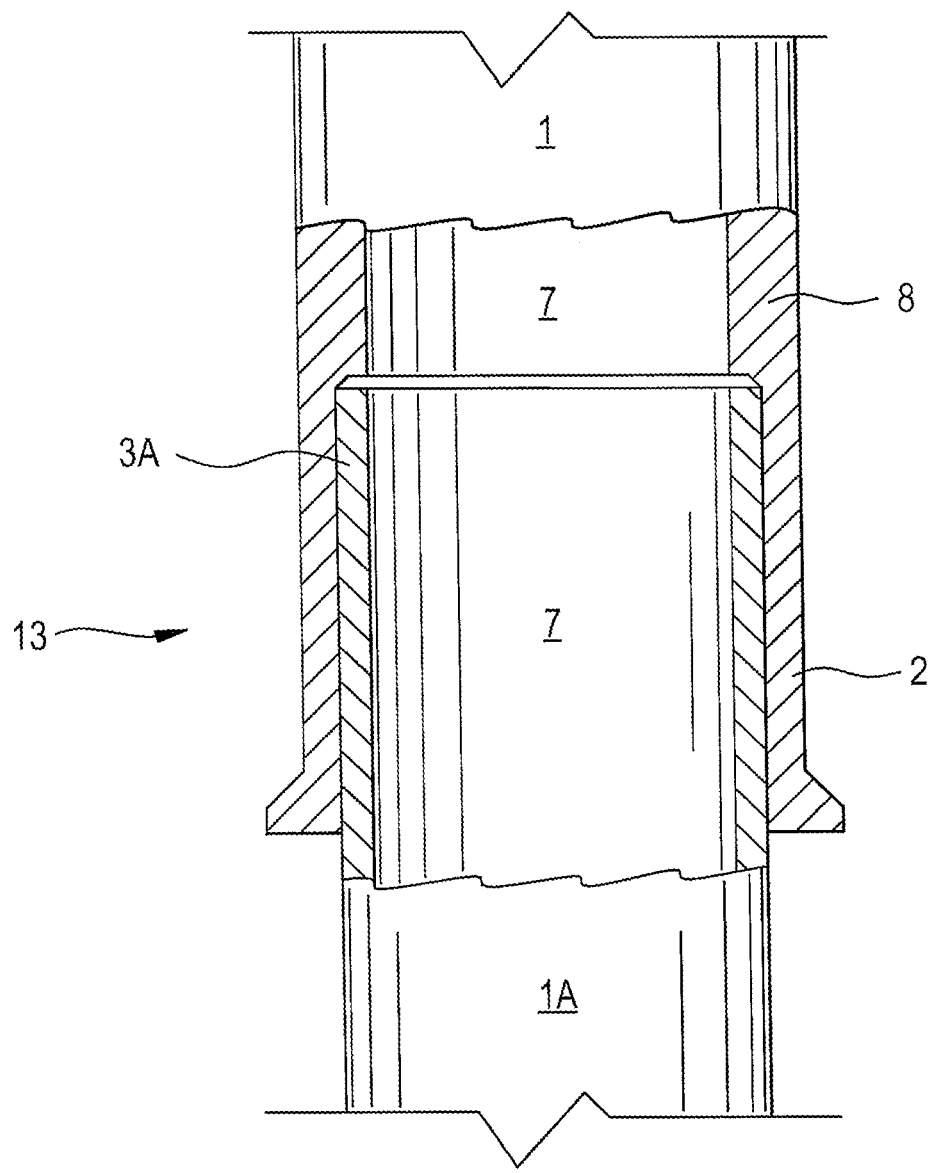
FIG. 3 is a side view of the invention, partially sectioned, showing the slip joint design of the invention used for extended height.

FIG. 1 shows a hollow, centrifugally cast, utility pole 1 in a direct burial configuration according to an embodiment of the invention. FIG. 2 shows the invention in a pedestal or foundation-mounted configuration according to a second embodiment of the invention. The pole 1 of FIGS. 1 and 2 has been centrifugally cast in a manner which imparts a tapered shape to the external linear dimensions of the pole 1 from pole butt 2 to pole top 3 as shown. The tapered shape of the pole 1 gives the pole 1 added strength and also saves raw materials during the casting operation. The embodiments of FIGS. 1 and 2 further comprise a pole cap 4 and pre-drilled or field modified holes 5 for attachment of typical utility pole hardware and fixtures. Also shown in the embodiment of FIG. 1 is an access panel 6. Said panel 6 is located near the bottom interior or core 7 of the pole 1 in situations where internal hardware such as cables or wires have been installed within said hollow core 7. The centrifugal casting of the tapered pole 1 provides for the controlled wall thickness 8 along the entire length of the pole 1 whereby the wall thickness imparted to the pole 1 is controlled by design from pole top 3 to pole butt 2. This controlled wall thickness 8 provides greater design flexibility and strength to the pole 1.

FIG. 2 shows the pole 1 with a flange 9 at its butt 2 to enable the pole 1 to be mounted and secured to a foundation 10 or other pedestal-type apparatus. In this embodiment, the pole 1 is shown secured to the foundation 10 by a plurality of bolts 11 and nuts 12.

FIG. 3 shows the press-fit, slip joint 13 configuration of the invention used to interconnect two or more cast pole 1 sections for extended height. The slip-joint 13 comprises a tapered, centrifugally cast, utility pole 1, according to the invention, wherein the internal core 7 diameter of the pole 1, beginning at the butt 2 of the pole 1 and extending internally linearly along a portion of the length of the pole 1, has been cast to have internal dimensions which allow the butt 2 of the pole 1 to slidably engage the top portion 3A of another centrifugally cast tapered pole 1A. Such interconnection provides for virtually unlimited extensions of pole 1 height.

Figure 4:
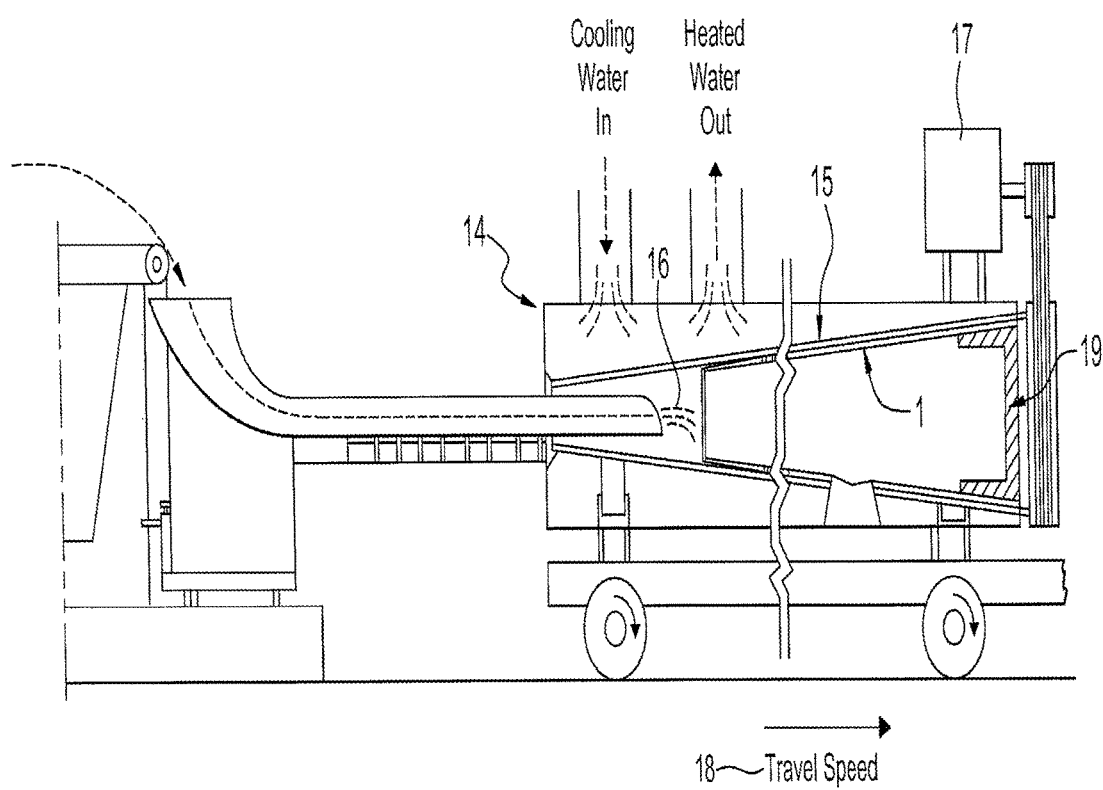
FIG. 4 is a diagrammatic view of a typical centrifugal casting machine being used to cast an embodiment of the invention. Also shown, in partial longitudinal section is the tapered mold.

FIG. 4 shows a typical centrifugal casting machine 14 being used to cast an embodiment of the invention. An internally tapered mold 15 is similar to conventional centrifugal casting molds with the exception of the internal linear dimensions of the mold 15 as shown in the longitudinal cross-section of the mold 15 is generally circular in form, however, the internal surface of the mold 15 could be modified to produce tapered poles having multisided dimensions such as poles with generally square or polygonal cross-sections. In the preferred embodiment of pole 1, an internally tapered chill-type mold 15, is used to impart a tapered external shape to the pole 1. Depending on the particular application and strength required of the pole 1, the overall wall thickness 8 (FIGS. 1 and 2) of the pole 1 may be varied during the casting operation by the pouring rate of material 16 allowed to enter the centrifugal casting mold 15 and by varying the RPM of the motor 17 also by the travel speed of the machine 18.

Also shown in FIG. 4 is a core mold 19 used to form the slip-joint 13 (FIG. 3) of the invention during the centrifugal casting process. When desired, said core mold 19 is inserted into the mold 15 at the butt 2 (FIGS. 1 and 2) of the pole 1 being centrifugally cast. When present during the centrifugal casting operation, the core mold 19 causes the core 7 (FIGS. 1 and 2) diameter of the cast pole 1 to be uniformly controlled along the length of said core mold 19. The core 7 (FIGS. 1 and 2) diameter formed by the use of said core mold 19 during the centrifugal casting process is sufficient to enable the butt 2 (FIGS. 1 and 2) of the pole 1 after casting to slidably engage the top portion 3A (FIG. 3) of another centrifugally cast pole 1A (FIG. 3).

Figure 5:
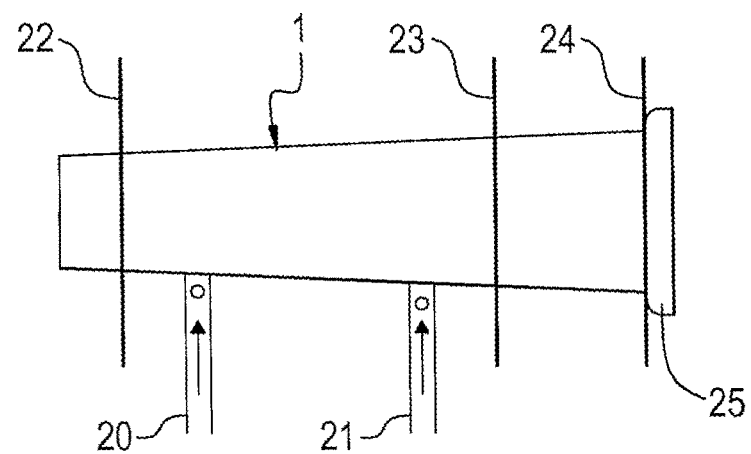
FIG. 5 illustrates the use of the running ring and the third rail being used to control the tapered pole as it rolls through an annealing furnace.

FIG. 5 shows tapered pole 1 as it is pushed through the annealing furnace by pusher chains 20 and 21 along running rails 22, 23 and 24. As tapered pole 1 begins to travels in a circular path along running rails 22, 23 and 24, running ring 25 engages the third running rail 24, thereby allowing the tapered pole 1 to run essentially straight through an annealing furnace. The running ring 25 also allows for tapered pole 1 to be inserted into a conventional round pipe and carried thru an annealing furnace.

Figure 6:
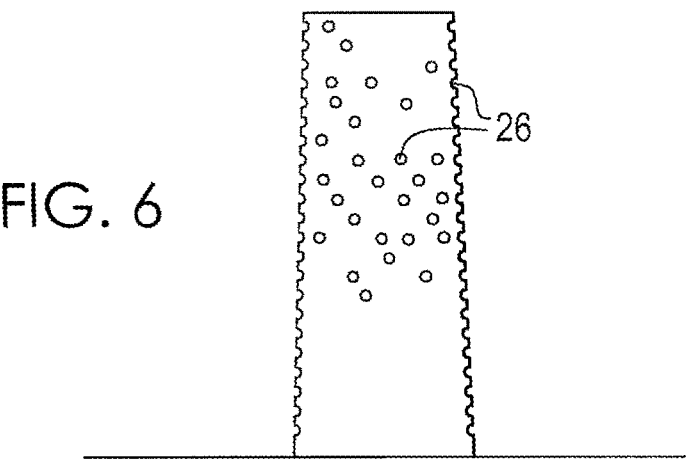
FIG. 6 shows the effective use of a dimpled surface to create turbulence, thereby reducing wind loading on the pole during high wind conditions.

FIG. 6 shows texture (pimples) 26, which are cast into the surface of the pole's exterior during the manufacturing process. These pimples 26 are effective in reducing wind resistance on the face of the pole.

Figure 7:
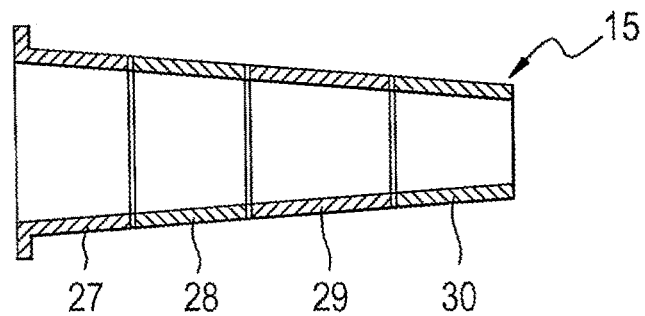
FIG. 7 shows the procedure required to produce a long tapered mold, which is machined inside.

FIG. 7 illustrates one method of producing a tapered mold 15. The tapered mold 15 is made by matching various short tapered tubes 27, 28, 29, and 30 that have been machined prior to being welded into one long section, eliminating the need to bore long tapered I.D. holes.

While the invention has been particularly shown and described with reference to the preferred embodiments thereof, it will be understood by those skilled in the art that various alterations in form, detail and construction may be made therein without departing from the spirit and scope of the invention.

What is claimed is:

1. A hollow, tapered, cylindrical utility pole having an outer diameter that varies along a length of the member, comprising:
   a tapered, seamless, unitary cylindrical wall made of a metallic material via centrifugal casting, wherein a first portion of the tapered cylindrical wall has a first thickness, wherein a second portion of the tapered cylindrical wall has a second thickness that is different from the first thickness, wherein the first thickness of the tapered cylindrical wall is substantially constant along a majority of the length of the cylindrical wall, and wherein an interior surface of a large diameter end of the tapered cylindrical wall has a shape and dimensions that would allow an external surface of a small diameter end of a second hollow, tapered, cylindrical utility pole to be inserted into the large diameter end of the tapered cylindrical wall; and
   a running ring also formed by the centrifugal casting and comprising a circular or ring-shaped flange that extends radially outward from an exterior side of the large diameter end of the tapered cylindrical wall, wherein the running ring is configured such that as the tapered, cylindrical utility pole is rolled along an annealing furnace, a surface of the flange will engage a running rail in the annealing furnace to cause the tapered, cylindrical utility pole to follow a substantially straight passage through the annealing furnace.

2. The hollow, tapered cylindrical utility pole of claim 1, wherein an interior diameter of the cylindrical wall narrows along the length of the cylindrical wall.

3. The hollow, tapered cylindrical utility pole of claim 1, wherein the first thickness of the first portion of the tapered, cylindrical wall is substantially uniform along the length of the first portion, and wherein the second thickness of the second portion of the tapered, cylindrical wall is substantially uniform along the length of the second portion.

4. The hollow, tapered cylindrical utility pole of claim 1, further comprising an access aperture that extends through the tapered, cylindrical wall adjacent the large diameter end of the tapered, cylindrical wall.

5. The hollow, tapered cylindrical utility pole of claim 1, wherein the access aperture is generally rectangular in shape.

6. The hollow, tapered cylindrical utility pole of claim 1, wherein the tapered, seamless, unitary cylindrical wall is formed via centrifugal casting process in which molten metallic casting material is poured into a rotating mold while the rotating mold is translated, and in which at least one of a pouring rate of the molten metallic casting material, a rotational speed of the rotating mold and a translation speed of the rotating mold is varied during the casting operation such that the first thickness of the tapered cylindrical wall is substantially constant along a majority of the length of the cylindrical wall.

\* \* \* \* \*